G. W. BULLEY.
GUIDING MECHANISM FOR VEHICLES.
APPLICATION FILED JAN. 22, 1914.
1,136,652.
Patented Apr. 20, 1915.
2 SHEETS—SHEET 2.
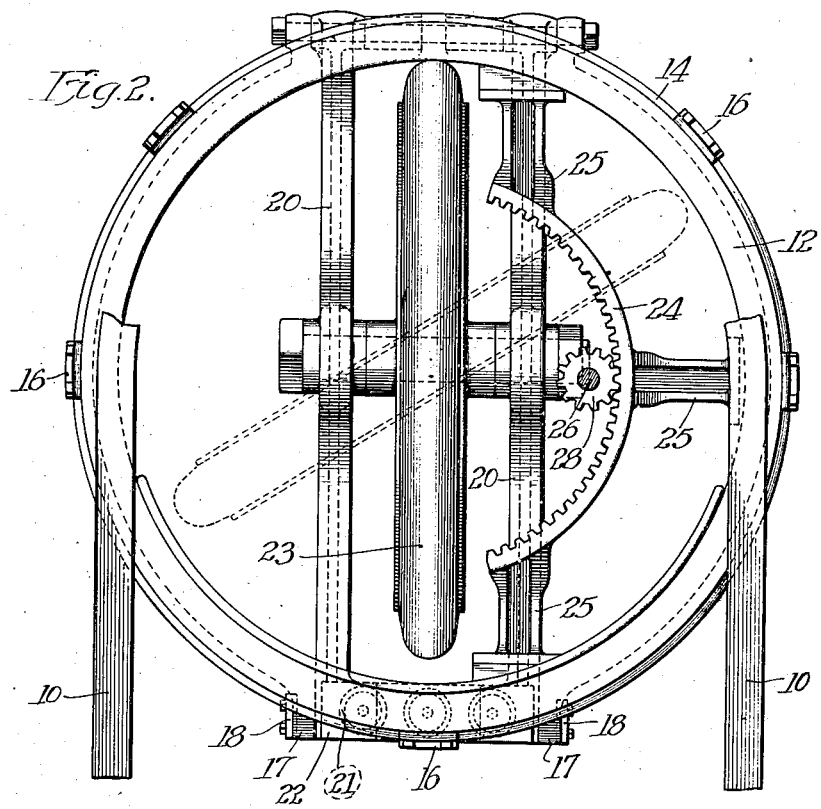
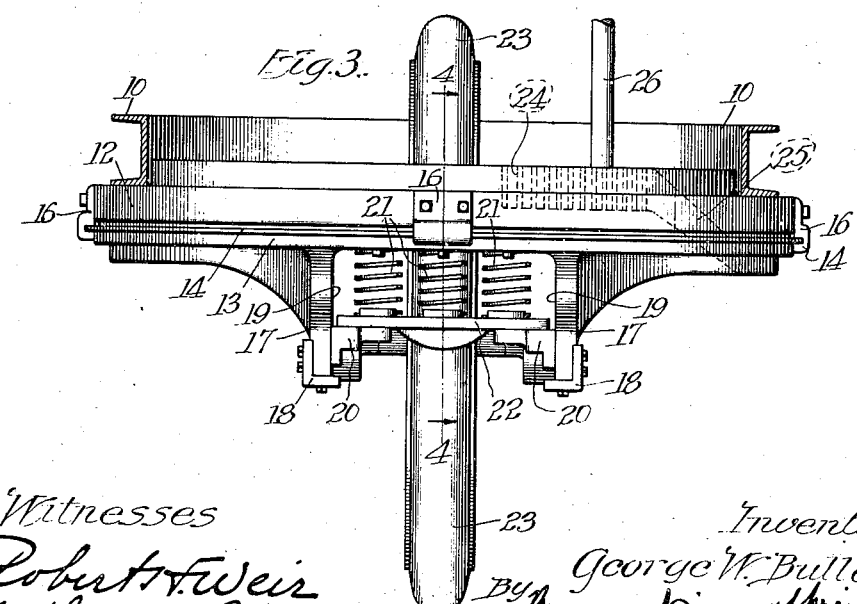
Witnesses
Robert F. Weir
Arthur W. Carlson
Inventor
George W. Bulley
By Brown Nissen & Sprinkle
Attys.

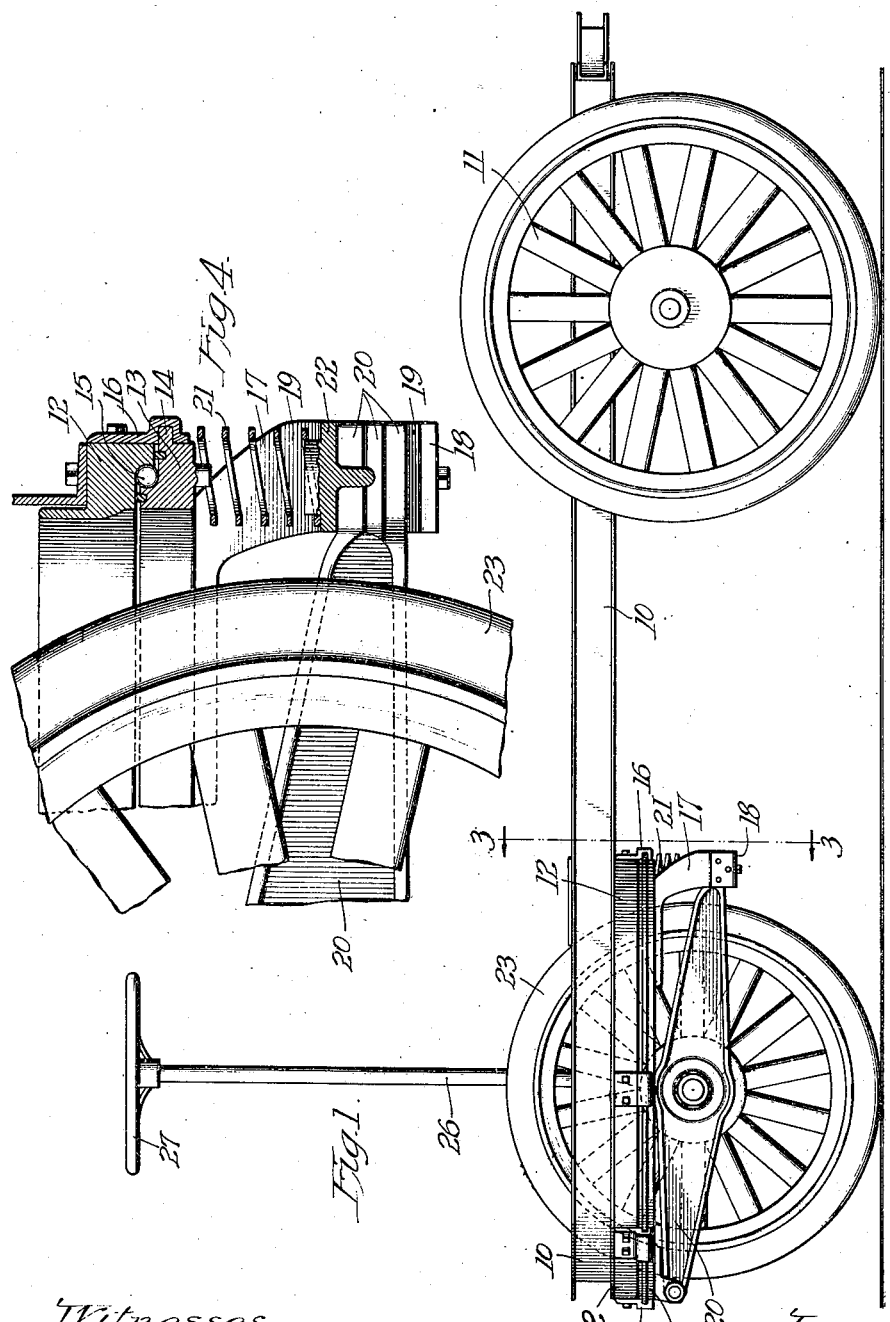

UNITED STATES PATENT OFFICE.

GEORGE W. BULLEY, OF CHICAGO, ILLINOIS.

GUIDING MECHANISM FOR VEHICLES.

1,136,652.

Specification of Letters Patent. Patented Apr. 20, 1915.

Application filed January 22, 1914. Serial No. 813,788.

*To all whom it may concern:*

Be it known that I, GEORGE W. BULLEY, a citizen of the United States, residing at Chicago, in the county of Cook and State of Illinois, have invented certain new and useful Improvements in Guiding Mechanism for Vehicles, of which the following is a specification.

My invention relates to guiding mechanism for vehicles, and has for its primary object the provision of improved mechanism of that kind whereby the guiding mechanism of the vehicle may be reduced with relation to the width of the vehicle and whereby the vehicle may be turned in a sharp curve.

With the above and other objects in view this invention consists substantially in the combination, arrangement and construction of parts all as hereinafter described, shown in the accompanying drawings which form a part of this specification and illustrate the preferred embodiment of my invention, and more particularly set forth in the subjoined claims.

In the drawings, Figure 1 is a side elevation of the running gear of a vehicle embodying my invention; Fig. 2 is a plan view of one end of the vehicle shown in Fig. 1 with portions broken away for clearness; Fig. 3 is a section taken on the line 3—3 of Fig. 1, looking in the direction indicated by the arrows, and having the upper portion of a steering post broken away; and Fig. 4 is a section taken approximately on the line 4—4 of Fig. 3 and looking in the direction indicated by the arrows.

By the use of my invention a single wheel may be used in the forward end of the vehicle for the guiding wheel, and for that reason the width taken up in the road by the guiding mechanism is greatly reduced thereby allowing a turning of the vehicle within a short radius.

By means of my improved mechanism the guiding wheel may be turned upon its vertical diameter through many degrees thereby reducing still further the area necessary to be covered in turning the vehicle.

In the drawings is illustrated a form of my invention employing a single guiding wheel but, realizing that a plurality of guiding wheels might be employed in connection with my invention, I do not limit myself to the use of a single wheel.

Reference numeral 10 indicates the main frame of a vehicle, one of the rear wheels of which is shown at 11 in Fig. 1. Secured to the forward portion of the frame 10 in any suitable manner is a bearing ring 12. Below the bearing ring 12 is a turn-table 13 of approximately the same diameter as the ring 12 and comprising an annulus having a peripheral flange 14. As shown in Fig. 4, the ring 12 and turn-table 13 are oppositely provided with ball races within which are positioned bearing balls 15. Any suitable securing means, such as the channel plates 16, are employed to retain the parts 12 and 13 in proper co-acting relation, the channel plates being preferably bolted at intervals to the ring 12 and having their channeled portion engaging the flange 14 of the turn-table 13. Secured in fixed relation to the turn-table 13 and preferably formed integrally therewith at its rearward portion and extending downwardly are two yoke arms 17 provided with angle pieces 18 at their lower extremities which extend slightly toward each other at the bottom of the arms. The opposed faces of the arms 17 are preferably plane surfaces, as shown at 19 in Figs. 3 and 4, and the angle pieces 18 each form a ledge or stop at the bottom of the plane surface 19. Two yokes 20 spaced a suitable distance from each other are hinged to the forward part of the turn-table 13 and extend rearwardly, terminating between the arms 17. Their rearward ends are preferably flattened to coöperate with the plane surfaces 19 of the opposed faces of the arms 17 whereby the rearward ends of the yokes 20 may rise and fall in contact with the plane surfaces 19 without undue friction. The downward passage of the rearward ends of the yokes 20 is limited with relation to the arms 17 and turn-table 13 by the projecting ends of the angle pieces 18. Any suitable resilient means, such as the springs 21, is inserted between the rearward ends of the yokes and the lower surface of the turn-table 13, an approximately horizontal plate 22 being positioned across the rearward ends of the yokes to receive the thrust of the resilient means. A guiding wheel 23 is journaled in the yokes 20 adjacent the centers thereof. A curved rack 24 concentric with the ring 12 and turn-table 13, but preferably of a somewhat smaller radius, is secured in fixed relation to the turn-table 13 by means of brackets 25 which elevate the rack 24 above the level of the yokes 20. A steering rod 26, fixed in any suitable manner with relation to the frame of the vehicle and provided at its upper end with a handle 27, carries at its lower end a pinion 28 meshing with the rack 24.

In the operation of my invention as the vehicle travels the rotation by the operator of the pinion 28 by means of the steering post 26 and handle 27 causes a turning of the rack 24 and the turn-table 13 to which it is secured, together with the wheel 23, the yokes 20 being carried by the turn-table and carrying the wheel with them as they turn. In this manner were it desired to turn to the right rather sharply the wheel 23 would assume a position approximating that illustrated in dotted lines in Fig. 2. For the sake of clearness the adjusted position of other parts of the mechanism is not shown. It will be seen that the guiding mechanism is almost entirely contained within the width of the frame 10 thereby leaving no large projections to be accommodated in turning the vehicle. The number of degrees through which the guiding wheel 23 may be turned is limited only by the length of the curved rack 24 it appearing practical, however, to construct the rack as illustrated in Figs. 2 and 3. Obstructions encountered in the roadway by the wheel 23 during the travel of the vehicle convey a reduced shock to the load upon the vehicle by reason of the interposition of the springs 21 between the rear or free ends of the yokes 20 and the body of the turn-table 13, it being noted that while the turn-table is free to rotate with respect to the frame 10 and the ring 12 it is retained against separation therefrom by means of the channel plates 16. After passing an obstruction in the roadway should the upward throw or rebound of the vehicle body be such as to raise the turn-table 13 with respect to the wheel 23 and the yokes 20 the free or rear ends of the yokes 20 will be protected against disengagement with respect to the arms 17 by means of the angle pieces 18.

In the accompanying drawings and in the foregoing description is set forth the preferred embodiment of my invention, but it is obvious that one skilled in the art may make modifications thereof without departing from the spirit of the invention.

I claim:

1. Vehicle guiding mechanism combining a bearing ring fixed with respect to the body of the vehicle, an annular turn-table having roller bearing engagement with the bearing ring, means for securing the ring and turn-table from dis-engagement, said turn-table being rotatable with respect to the bearing ring, two spaced yokes hinged at adjacent ends to a point upon the turn-table, a vertical bearing formed at the opposite side of the turn-table and in which the opposite ends of the yokes are movably carried, means joining the said opposite ends of the yokes, and resilient means interposed between said joining means and the body of the turn-table.

2. Vehicle guiding mechanism combining a bearing ring fixed with respect to the body of the vehicle, an annular turn-table having roller bearing engagement with the bearing ring, means for securing the ring and turn-table from dis-engagement, said turn-table being rotatable with respect to the bearing ring, two spaced yokes hinged at adjacent ends to a point upon the turn-table, a vertical bearing formed at the opposite side of the turn-table and in which the opposite ends of the yokes are movably carried, means joining the said opposite ends of the yokes, resilient means interposed between said joining means and the body of the turn-table, and apparatus operable from the body of the vehicle for oscillating the turn-table in the bearing ring.

3. The combination with a vehicle, of an annular bearing fixed with respect to the body of the vehicle, a turn-table engaging the bearing and rotatable in an approximately horizontal plane with respect thereto, spaced wheel bearings hinged at adjacent ends to a point near the periphery of the turn-table, retaining arms for the opposite ends of the wheel bearings positioned substantially at the opposite side of the turn-table from the hinge side, said opposite ends of the wheel bearings being vertically movable with respect to the retaining arms and the turn-table, stops upon the retaining arms limiting the downward movement of arms limiting the downward movement of said opposite ends of the yokes with respect to the retaining arms, resilient means interposed between said opposite ends of the wheel bearings and the body of the turn-table, and a wheel journaled in the wheel bearings.

4. The combination of a bearing ring, a turn-table ring concentric therewith and rotatable with respect thereto, a bearing frame extending diametrically across said turn-table ring and comprising spaced side bars pivoted at one end to the turn-table, guide bearings on said turn-table diametrically opposite the said pivot and in which the free end of said bearing frame reciprocates, means for limiting the movement of the free end of said frame in one direction, spring mechanism interposed between the turn-table and the free end of said bearing frame for yieldingly supporting the turn-table upon the free end of said frame, and a wheel positioned substantially within said turn-table ring and between the side bars of said bearing frame and journaled in said bearing frame intermediate the ends thereof.

5. The combination of a turn-table, a pair of yokes pivoted at their forward ends to said turn-table with their rearward ends disposed under the rear side of said turn-table, arms depending from the rear side of the turn-table and having parallel surfaces thereon engaging the rear end portions of the yokes limiting lateral movement of the latter, stops at the lower ends of said arms adapted to engage the yokes and limit the downward movement of the rear ends thereof, a plate joining the rear ends of the yokes, and a compression spring between said plate and the turn-table.

In testimony whereof I have signed my name to this specification, in the presence of two subscribing witnesses, on this 2nd day of April, A. D. 1914.

GEORGE W. BULLEY.

Witnesses:
CHARLES H. SEEM,
H. G. ROCKWELL.